Jan. 20, 1970     R. W. HAIN ET AL     3,490,601
DROPDOWN TYPE KNIFE BOX
Filed Feb. 6, 1968
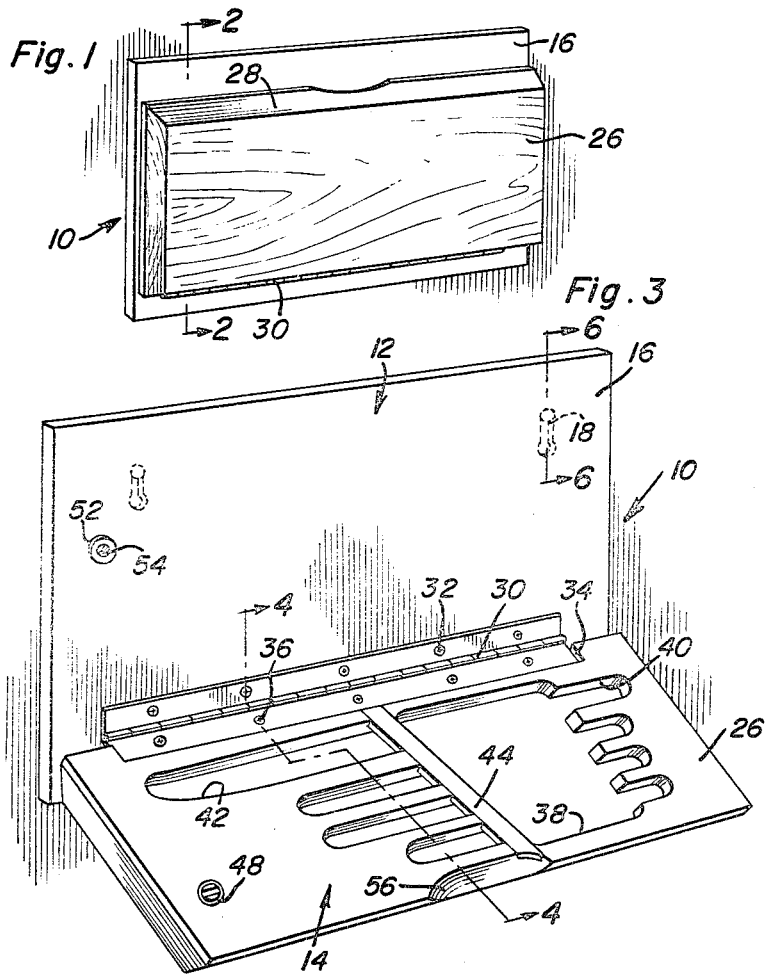
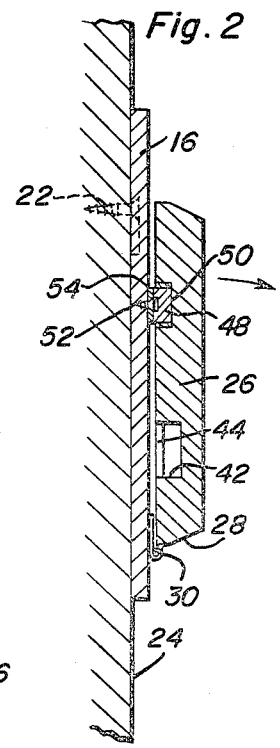
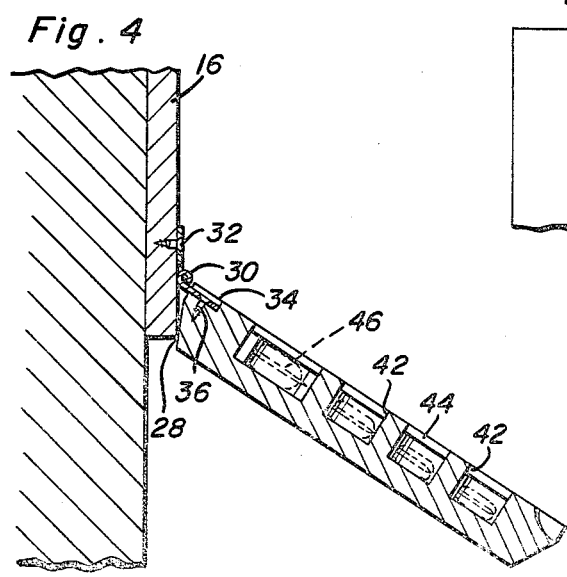
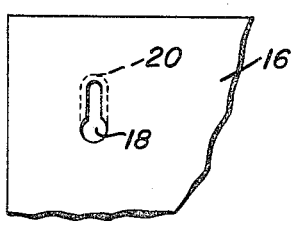
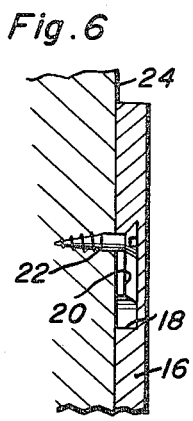
Robert W. Hain
Richard A. Warn, Sr.
INVENTORS
BY Clarence A. O'Brien
and Harvey B. Jacobson
Attorneys

United States Patent Office 3,490,601
Patented Jan. 20, 1970

3,490,601
DROPDOWN TYPE KNIFE BOX
Robert W. Hain, Edison, and Richard A. Warn, Sr., Milltown, N.J., assignors to Washington Forge, Inc., a corporation of New Jersey
Filed Feb. 6, 1968, Ser. No. 703,403
Int. Cl. A47f 7/00; B65d 85/54
U.S. Cl. 211—60                                                    3 Claims

ABSTRACT OF THE DISCLOSURE

A knife box in the form of a supporting board having a rack board pivotally attached thereto with the rack board having recessed areas and a retaining bar across the recesses to retain the knives therein. The rack board is retained in adjacent relation to the support board by a magnetic type of retainer device and the support board may be supported on a vertical wall surface or the knife box may be placed in a drawer or the like.

---

The present invention generally relates to a knife box or container in the form of a rack assembly including a supporting board and a rack board pivotally interconnected along the bottom horizontal edge portions thereof so that the rack board may swing down to a generally horizontal but downwardly inclined position to orientate a plurality of knives supported in recesses in the rack board for easy access. The rack board includes a magnetic device associated with the corresponding magnetic device on the support board for retaining the rack board against the surface of the supporting board. Another feature of the device is the provision of keyhole slots in the supporting board to support the assembly on a vertical wall surface in a detachable manner thereby enabling the device to be supported in a vertical position or on a horizontal surface such as in a drawer or the like.

It is an object of the present invention to provide a knife box having the features mentioned previously which is relatively simple in construction, easy to install, inexpensive to manufacture and yet neat and attractive in appearance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the dropdown knife box of the present invention with the rack board in closed position;

FIGURE 2 is a vertical sectional view taken substantially upon a plane passing along section line 2—2 of FIGURE 1 illustrating the structure details of the above invention;

FIGURE 3 is a perspective view of the knife box with the rack board disposed in open position;

FIGURE 4 is a detailed sectional view taken substantially upon a plane passing along section line 4—4 of FIGURE 3 illustrating further structural details of the rack board and its association with the supporting board;

FIGURE 5 is a rear corner view of the support board illustrating the keyhole slot formed therein; and FIGURE 6 is a detailed sectional view taken substantially upon a plane passing along section line 6—6 of FIGURE 3 illustrating the association of the headed screw and the keyhole slot in the rear surface of the support board.

Referring now specifically to the drawings, the dropdown type of knife box of the present invention is generally designated by the numeral 10 and includes two components, namely, a supporting board generally designated by the numeral 12 and a rack board generally designated by the numeral 14.

The supporting board 12 includes a rectangular panel 16 of wood or other rigid material having substantially planar faces. The rear surface of the panel 16 is provided with a pair of keyhole slots 18 in which the shank of the slot is undercut as at 20 to receive the headed end of a conventional wood screw 22 for mounting the support board 10 on a wall surface 24. Thus, by first inserting two screws 22 into the wall surface 24 with the heads thereof being spaced away from the wall surface 24, the support board 16 may be easily mounted in position by slipping the heads of the screws 22 into the lower ends of the keyhole slots and then moving the support board downward in a known manner.

The rack board 14 includes a rigid elongated rectangular panel 26 having substantially planar surfaces with the peripheral edge being inclined as at 28. As illustrated in FIGURE 1, the rack board 26 is not as wide as the support board 16 and it is also slightly shorter. Thus, the inclined peripheral surfaces or edges 28 provide a transitional juncture with the front surface of the support board 16.

The inner or bottom edge of the rack board 26 is hingedly attached to the lower surface portion of the support board 16 by an elongated hinge structure 30 which may be conveniently a piano-type hinge with the hinge strap being secured to the front surface of the support board 16 by fasteners 32 with the other hinge strap being recessed into a recess 34 formed in the rack board 26 and secured thereto by suitable fasteners 36. The hinge construction together with its association with the bottom edge of the support board 16 and the inclined edge surface 28 cooperate to form a stop for limiting the downward pivoting movement of the rack board 26 about the hinge axis defined by the piano hinge 30 so that the rack board 26 will be disposed in a downwardly inclined position when the support board 16 is supported vertically on the wall surface 24 as illustrated in FIGURES 3 and 4.

The upper surface of the rack board 26 is provided with an enlarged recessed area 38 having a plurality of notches or recesses 40 associated with one edge thereof and a plurality of recesses or notches 42 associated with the other edge of the recess 38 which is inclined laterally and defined by a transverse retaining bar 44 which forms a transverse member extending across the juncture between the enlarged recess area 38 and the longitudinal recesses or notches 42. As illustrated, the rack board 26 is substantially thick as compared with the support board 16 and the recess 38 as well as the recesses 40 and 42 are all substantially the same depth which is sufficient to receive knives 46 therein with the blade portions of the knives received in the recesses 42 in underlying relation to the transverse bar 44. The butt ends of the handles are received in the recesses or notches 40 with the juncture area between the handles and blades of the knives being disposed adjacent to the area underlying the transverse bar 44 but being accessible by inserting the fingers between the handles of adjacent knives in the enlarged recess area 38. Thus, the knives will be retained in position by virtue of the blades thereof being received in the recesses 42 and the butt ends of the handles received in the recesses 40 with the transverse bar overlying the knives to prevent them from being accidentally displaced from the rack. The bar 44 is rigid with the rack board 26 and is recessed into the upper surface thereof to retain the planar condition of the upper surface of the rack board 26.

With the knives supported in the rack board as illustrated in FIGURES 3 and 4, they are readily accessible to a housewife or other person using a knife. Then, when the need for the knives has passed, they are reinserted into the rack board 26 and the rack board 26 pivoted to the stored or upright position illustrated in FIGURES 1 and 2 about the hinge 30. The knives will be retained in position in the rack board 26 by the transverse bar 44 during such pivotal movement. The reason for the transverse inclination of the bar 44 is to provide retention for knives of various types and configurations which will normally be employed to make up a set of knives, that is, at least one long knife, at least one relatively short knife and one or more intermediate length knives.

For releasably retaining the rack board 26 in the stored position or vertical position alongside of the support board 16, one corner area of the planar upper surface of the rack board 26 is provided with a permanent magnet 48 is provided in a recess 50 therein with the magnet being secured in place by a suitable bonding material such as an adhesive or the magnet may be provided with a resilient sleeve encircling the same and bonded in the recess. In any event, the surface of the magnet 48 is substantially flush with but may possibly project slightly outward from the surface of the rack board 26. The magnet is associated with a retaining member 52 in the form of a metallic washer or the like that is attached to the support board 16 by a suitable screw-threaded fastener 54 or the like so that when the rack board 26 is pivoted to its upright stored position, the magnet 48 will come into contact with the retaining washer 52 which is preferably constructed of a material subject to magnetic attraction such as a ferrous material or the like.

To facilitate gripping of the rack board 26, the upper inner edge thereof is provided with a gripping recess 56 in the inner corner thereof adjacent the center of the board to form a handgrip to enable a person to easily pivot the rack board downwardly to an outwardly extending and downwardly inclined position as determined by the inclined edge 28 engaging the support board 16 as illustrated in FIGURE 4.

In this construction, the recesses or routing is shaped individually to take specific pieces of cutlery. The magnetic retainer enables the rack board to be retained in the stored position but yet enables it to be pivoted downwardly to a position to enable access to the knives in an expedient manner. This construction also may be used on a vertical supporting surface on a horizontal surface or in a drawer as desired and the panels may be constructed of various materials to provide a decorative and attractive item. For example, the support board may be of one color or material whereas the rack board may be of another color or have another type of finish applied thereto which may be compatible with the surrounding cabinet structure in a kitchen or the like or otherwise attractive in appearance and easily installed by a homeowner or the like.

The foregoing is considered as illustrative only of the principles of the invention. Further, since numerous modification and changes will readily occur to those skilled in the art, it is not desired to limit the invention to the exact construction and operation shown and described.

What is claimed as new is as follows:

1. A knife holder comprising a support member having a substantially planar surface, elongated recess means in said planar surface receiving a knife, and a transverse retaining member extending across an intermediate portion of the recess means for retaining the knife therein.

2. The structure as defined in claim 1 together with means pivotally supporting said support member for pivotal movement about an axis generally parallel to the recess means therein, and means operatively associated with said support member and support means to retain the support member pivoted to a position with the planar surface thereof adjacent the support means.

3. The structure as defined in claim 1 wherein said recess means includes a plurality of side by side recesses to receive a plurality of knives, and an enlarged recessed area communicating all of said recesses intermediate the ends thereof, one edge of said recessed area being defined by said bar with the handles of the knives being disposed in said recessed area to enable access thereto.

References Cited

UNITED STATES PATENTS

| Re. 24,862 | 8/1960 | Odlum et al. | 206—16 X |
| 2,095,227 | 10/1937 | Brown | 312—245 |
| 2,338,303 | 1/1944 | Rosenberg. | |
| 2,609,921 | 9/1952 | Naken. | |
| 3,237,327 | 3/1966 | Griggs. | |

CASMIR A. NUNBERG, Primary Examiner

U.S. Cl. X.R.

206—16; 312—245